United States Patent
Mower et al.

(10) Patent No.: US 12,338,669 B1
(45) Date of Patent: Jun. 24, 2025

(54) BUS BOARDING PROTECTION SYSTEM AND METHOD

(71) Applicant: InterMotive, Inc., Auburn, CA (US)

(72) Inventors: Dan C. Mower, Grass Valley, CA (US); Gregory E. Schafer, Reno, NV (US); Tristan L. Ellorin, Sacramento, CA (US)

(73) Assignee: InterMotive, inc., Auburn, CA (US)

( * ) Notice: Subject to any disclaimer, the term of this patent is extended or adjusted under 35 U.S.C. 154(b) by 0 days.

(21) Appl. No.: 18/072,284

(22) Filed: Nov. 30, 2022

Related U.S. Application Data

(60) Provisional application No. 63/284,450, filed on Nov. 30, 2021.

(51) Int. Cl.
| | |
|---|---|
| *E05F 15/40* | (2015.01) |
| *B60Q 9/00* | (2006.01) |
| *F16H 61/16* | (2006.01) |
| *F16H 61/18* | (2006.01) |
| *G01S 7/521* | (2006.01) |
| *G01S 15/04* | (2006.01) |

(52) U.S. Cl.
CPC ................ *E05F 15/40* (2015.01); *B60Q 9/00* (2013.01); *G01S 7/521* (2013.01); *G01S 15/04* (2013.01); *E05Y 2900/506* (2013.01); *F16H 61/16* (2013.01); *F16H 61/18* (2013.01)

(58) Field of Classification Search
CPC ........... B60Q 9/00; G01S 7/521; G01S 15/04; E05Y 2900/506; F16H 61/16
See application file for complete search history.

(56) References Cited

U.S. PATENT DOCUMENTS

| | | | |
|---|---|---|---|
| 3,838,392 A | 9/1974 | Lockwood | |
| 4,200,167 A | 4/1980 | Cockman, Jr. | |
| 4,565,029 A * | 1/1986 | Kornbrekke | E05F 15/73 250/221 |
| 4,705,136 A | 11/1987 | Godsoe, Sr. | |
| 4,779,095 A * | 10/1988 | Guerreri | B60R 25/1004 348/148 |
| 5,839,304 A | 11/1998 | Wills | |
| 6,396,395 B1 | 5/2002 | Zielinski | |
| 6,758,298 B2 | 7/2004 | Eberling | |
| 9,020,730 B2 | 4/2015 | Agnew | |
| 2005/0253694 A1* | 11/2005 | Kuznarowis | B61L 23/041 340/436 |

(Continued)

FOREIGN PATENT DOCUMENTS

| | | | |
|---|---|---|---|
| KR | 1020100073171 | | 7/2010 |
| KR | 20110087666 A | * | 8/2011 |

(Continued)

*Primary Examiner* — Rufus C Point
(74) *Attorney, Agent, or Firm* — Heisler & Associates

(57) ABSTRACT

A sensor bar or other array of sensors are mounted to the bus beneath or adjacent to a doorway of the bus. Ultrasonic sensors are located within the sensor bar and detect the presence of foreign objects such as an entrapped passenger close to the doorway. A safety output is generated by the system when an unsafe condition is detected. Examples of safety outputs can include warning sounds, warning lights, automatic door opening, using the brake transmission shift interlock (BTSI) to prevent transmission shifting for vehicle movement, and other safety outputs.

4 Claims, 2 Drawing Sheets

(56) References Cited

U.S. PATENT DOCUMENTS

| | | | | |
|---|---|---|---|---|
| 2009/0139142 A1* | 6/2009 | Li | ............................ | E05F 15/73 49/25 |
| 2014/0172263 A1* | 6/2014 | Agnew | ................... | B60T 17/18 701/78 |
| 2020/0017068 A1* | 1/2020 | Moffa | ..................... | B60R 22/48 |

FOREIGN PATENT DOCUMENTS

| | | | | |
|---|---|---|---|---|
| KR | 101237734 | | 2/2013 | |
| KR | 101306238 | | 9/2013 | |
| KR | 1020140029078 | | 3/2014 | |
| KR | 1015309720000 | | 6/2015 | |
| WO | WO-2006072617 A2 * | | 7/2006 | ............... B61B 1/02 |

\* cited by examiner

BUS BOARDING PROTECTION SYSTEM AND METHOD

CROSS-REFERENCE TO RELATED APPLICATIONS

This application claims benefit under Title 35, United States Code § 119(e) of U.S. Provisional Application No. 63/284,450 filed on Nov. 30, 2021.

FIELD OF THE INVENTION

The following invention relates to sensors and systems around doors of vehicles such as buses to enhance safety. More particularly, this invention relates to sensors adjacent a door of a bus to detect and address when a passenger or other foreign object is located just outside of the doors, and potentially entrapped.

BACKGROUND OF THE INVENTION

While accidents involving school buses are rare, a variety of unusual circumstances can still present grave risks to children and others. One such risk involves children becoming trapped by a backpack or clothing caught in the bus door while off-boarding the bus. Typical school buses have a strong enough door that if a portion of a backpack or clothing gets trapped in the door while the child is off-boarding, the potential exists for the child to be trapped and dragged by the bus as it drives away, on an exterior of the bus. Because the child is outside of the bus door, and the inside of a school bus can be a noisy environment, it can be difficult to recognize this situation after it occurs, exacerbating the problem. An average of about three such dragging incidents occur every year in the United States.

This known problem has been the subject of a variety of attempts at a solution. One solution is to place sensors on the doors themselves to detect when something is trapped in the doors. While this solution has potential to be effective in many instances, other times a small but strong portion of the child's clothing, such as a strap of a backpack, or a hood of a jacket, is thin enough that it can be difficult for such sensors to detect. If the sensors do not detect the object caught in the door, the problem remains. If such sensors are too sensitive, the potential for excessive false positives from the system is presented.

School buses are also known to include sensor packages such as sensors to monitor space beneath the school bus or other vehicle sensors outside of the vehicle on various sides of the vehicle. Such sensors are for general safety monitoring, rather than focused around an exterior of the door. While such sensor packages have the potential to be effective, significant signal processing must be done to at least partially automate such systems and to provide a highly reliable signal that a problem exists. When warning systems are prone to false positives or less than highly reliable outputs, there is a tendency to turn off such safety systems, especially when they are designed to detect low frequency events. Accordingly, a need exists for a highly reliable sensor system which only outputs a safety signal when it is highly likely that a child is caught in the door, but which also is reliable in not missing such events when they truly occur.

SUMMARY OF THE INVENTION

With this invention, a sensor and safety output system is provided which is integrated into a school bus. At least one sensor (and typically an array of sensors) is provided in the form of ultrasonic sensors adjacent to the door. In particular, the array of sensors (with associated ultrasonic emitters) are provided in one example embodiment just below the door in a horizontal array facing away from the bus. Other sensors in alternate embodiments, such as LED lights or other lights and optical sensors can be provided on opposite sides of the door or top and bottom, either inside or outside of the door, which detect a child or object and adjacent the door when the light path is blocked.

The ultrasonic sensors can be similar to those which are often provided in bumpers of vehicles to assist in parking, and which typically provide an audible warning to a driver when other objects are coming close to the vehicle. Such sensors actually include both an ultrasonic emitter and an ultrasonic sensor, typically within a common housing taking up a small amount of space. An elongate rigid bar, such as a square cross-section steel bar can be provided just below the door on an outside of the bus. In one embodiment, this bar is a 1"×1" cross-section bar with a series of holes facing horizontally from below the door, facing outwardly.

An ultrasonic sensor is provided adjacent to each of these holes for emission of sound waves and for sensing of an echo resulting from the sound waves. Typically each sensor would emit a similar sound wave, so that the detected echo could be from the same sensor or one of the other sensors in the array. Alternatively, each emitter could emit an ultrasonic sound wave of different frequency, or at a slightly different time (such as using time division protocols), to keep each emitter paired with a particular sensor or group of sensors (and vice versa).

The sound waves are preferably of an ultrasonic frequency, so that the sound cannot be heard. Sound waves will leave the emitter, reflect off of a variety of different objects, and return back to the sensor. A time delay between transmission and reception can be divided in half to determine a distance (using the velocity of sound as well). For purposes of this invention, signals received later than a time corresponding with an echo off of an object about one to one and a half feet away are ignored. Thus, the sensor array has sensitivity for objects within one foot of the sensor array (or perhaps up to two feet, depending on the preferences of the user). In this way, individuals standing on curbs or sidewalks, other vehicles, curbs themselves, bushes, and other common objects will not cause false positives. However, if a child or other small person has somehow become trapped on an exterior of the bus by the door, the sensors will clearly pick up the presence of this person.

The sensor is coupled to a safety output which in one embodiment is in the form of a light and/or a speaker adjacent to the bus driver, and optionally also a brake transmission shift interlock (BTSI) of the bus. Typically a wire leading from the ultrasonic sensors is fed to a processor. The processor supplies power to the sensor array and receives signals back from the sensor array. When the signal received back from the sensor array corresponds with the probability that an undesired event has occurred, the signal is sent to the light and/or the speaker and/or the BTSI.

In one embodiment, the safety output is inoperative until the door is closed. In this way, children or other persons getting on and off the bus will not be constantly triggering safety outputs. As an alternative, the output operates with the door open, and the sound/lights triggered by children on-boarding the bus acts as a check that the system is operational. With the door open, the volume of any beeper can optionally be reduced to a less shrill intensity and/or character. As another option, lights can be active when the door is open, but sound output inactive, so that the light verifies operation of sensors of the system.

In one embodiment, when a safety output is received, the door can be opened and re-closed to reset the system and turn off the safety output. A button can also/alternatively act as a reset button and/or a mute button. Typically, a bus driver has high visibility of the door, so that viewing of the door, and opening the door and closing the door, gives the driver confidence that nothing is caught. However, the bus driver can also do a visual inspection if desired. In one embodiment, a reset button is provided near the door, requiring the bus driver to leave the bus driver seat and go to the area where a visual inspection could be done, before the system can be reset.

The system can lock the transmission by activation of the BTSI. Such activation may be effected by the processor communicating with the OEM CAN bus. Other implementations may use a hardwire electrical connection to the BTSI electronics. By appropriate programming, the BTSI can cause the transmission to be locked whenever the ultrasonic sensors are indicating that an object is adjacent to an outside of the door of the vehicle. Other alternate safety outputs could include activation of an electric parking brake, or other vehicle movement prevention system.

The bar preferably has a heater therein, which can melt snow and ice to assist in winter weather performance of the system. Puddle lights can be in the bar and shining down, activated with other bus lights, to provide a visibility enhancement which can also improve safety of bus on-boarding and off-boarding. Children (and others) who can clearly see the ground below the doorway of the bus can more safely and quickly exit the bus and avoid being caught by a closing door.

In systems where LEDs or other lights are provided opposite optical sensors (top/bottom or left/right), the system has a normal condition where the light is detected and an alarm condition when light is blocked and not detected by the sensors. These conditions are reported into other parts of the safety system described above, similar to the way that the ultrasonic sensors report echos indicative of a close object outside of the door.

As a further option especially for powered door open/close systems, the door open/close system can be controlled to open the door when the alarm condition is detected. This can be automatic, so that any capture of a backpack or clothing of a child or other person is quickly released. The opening can be partial, when such an alarm condition exists, typically enough to allow a backpack to be released.

OBJECTS OF THE INVENTION

Accordingly, a primary object of the present invention is to provide a system for preventing dragging of an entrapped passenger outside of a door of a bus.

Another object of the present invention is to provide a system which warns an operator of a bus of a potentially dangerous condition occurring outside of the bus doorway.

Another object of the present invention is to provide a system which keeps the bus from operating when a potentially dangerous condition might be present.

Another object of the present invention is to provide a method for detecting the presence of foreign objects outside of a doorway of a bus, and keeping the bus operating safely.

Other further objects of the present invention will become apparent from a careful reading of the included drawing figures, the claims and detailed description of the invention.

DESCRIPTION OF THE PREFERRED EMBODIMENT

Figure 2:
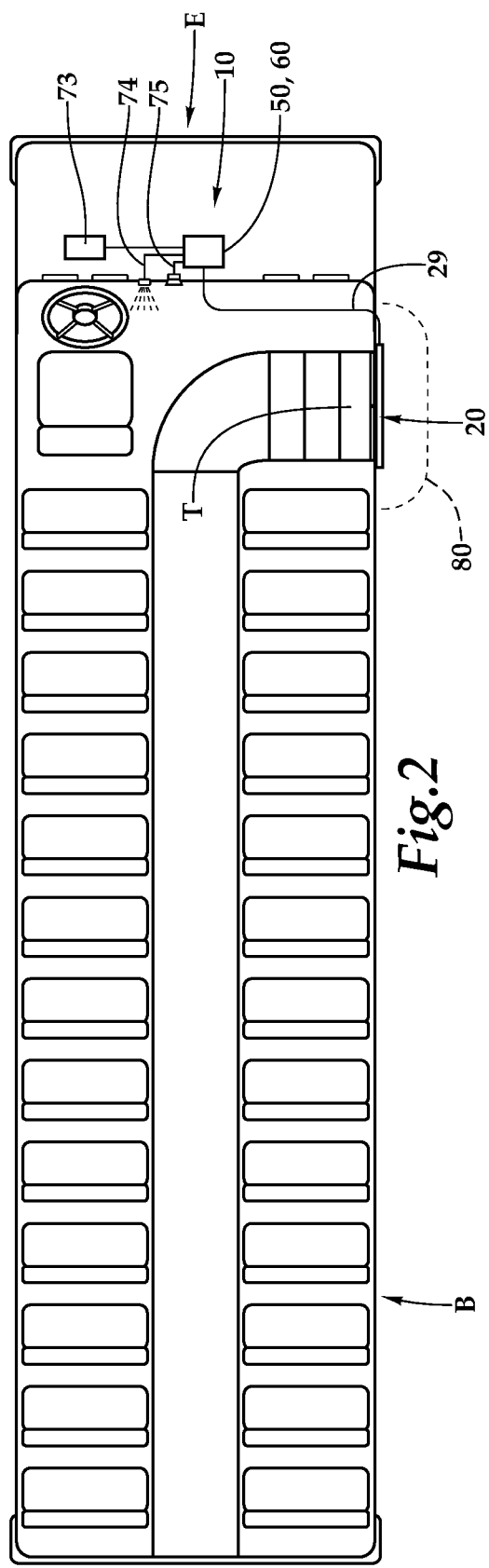
FIG. 2 is a top plan view of that which is shown in FIG. 1.
Figure 1:
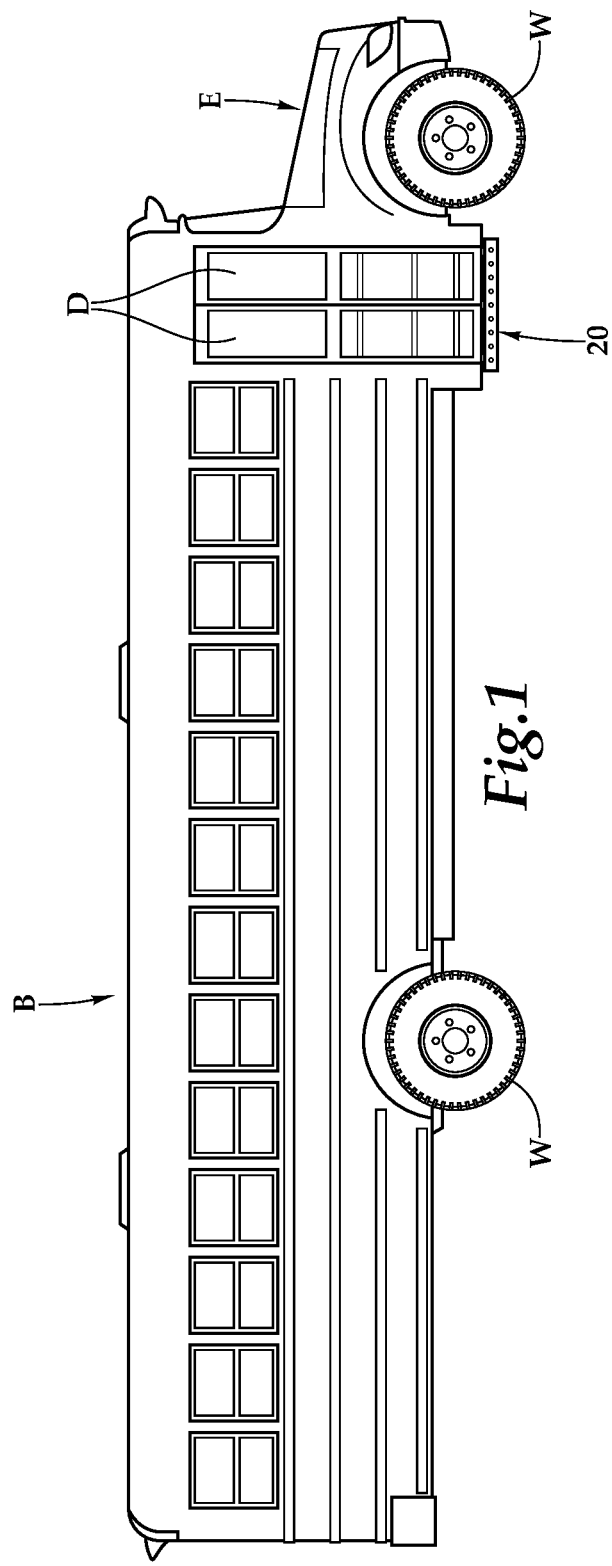
FIG. 1 is a side elevation view of a bus with the boarding protection system of this invention attached thereto and incorporated therewith.

Referring to the drawings, wherein like reference numerals represent like parts throughout the various drawing figures, reference numeral 10 is directed to a protection system which monitors a sensor area 80 outboard of a doorway and doors D of a bus B (FIGS. 1 and 2). The system outputs one or more of a variety of safety outputs responsive to a potentially dangerous alarm condition to prevent vehicle motion, open doors D, or at least warn the driver of the bus B that a dangerous condition may exist.

Figure 3:
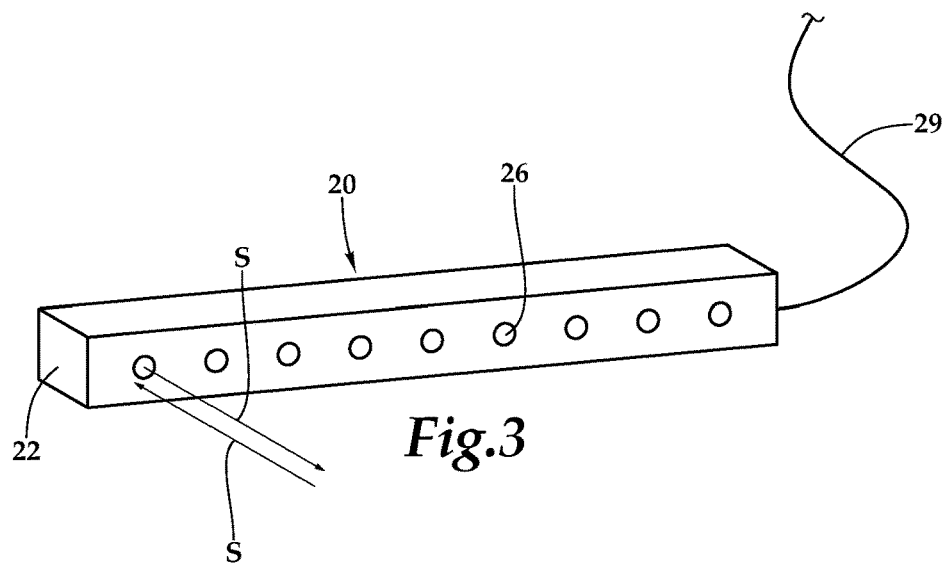
FIG. 3 is a perspective view of a sensor bar with ultrasonic sensors according to one embodiment of this invention.
Figure 5:
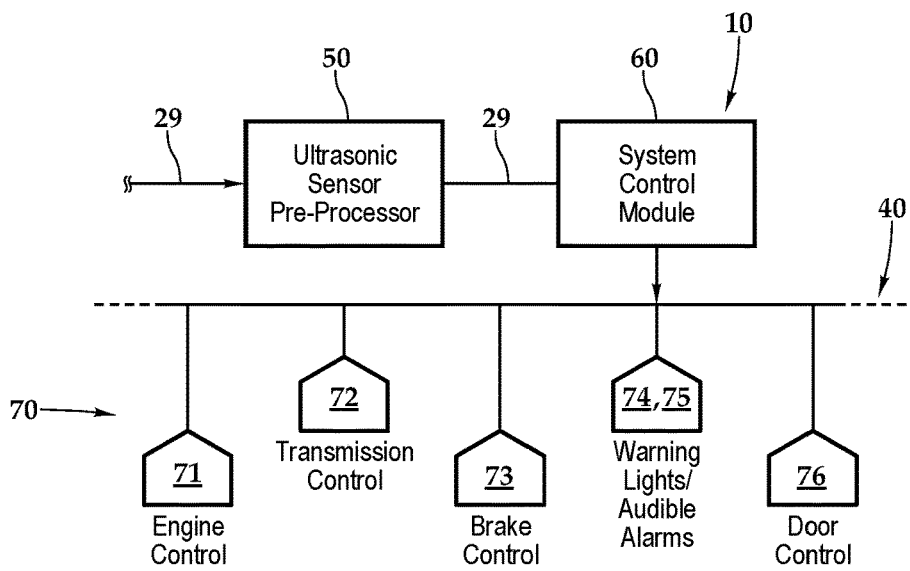
FIG. 5 is a schematic illustrating how components of the system of this invention can be arranged in one embodiment to implement the system and method of this invention.

In essence, and with particular reference to FIGS. 1-3, basic details of the system are described, according to an example embodiment. The protection system 10 includes a sensor bar 20 with a series of ultrasonic sensors 26, 28 therein and facing a sensor area 80 just outside of a bottom step at a doorway where the doors D of the bus B are located. The sensor bar 20 is located beneath a doorway and doors D of a bus B. Puddle lights 30 can optionally be provided shining down from the bottom of the center bar 20. With reference to FIG. 5, in one embodiment the sensors 26, 28 within the sensor bar 20 are connected to a system control module 60 which is coupled to the Control Area Network ("CAN") 40, and configured to control other portions of the vehicle as an alarm safety output 70.

Figure 4:
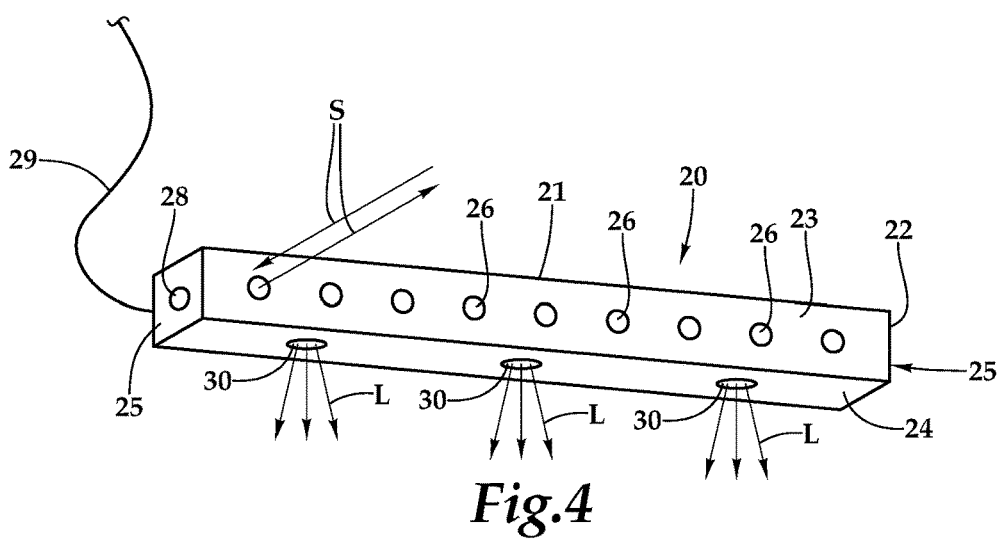
FIG. 4 is a perspective view from below of that which is shown in FIG. 3, and with the sensor bar also incorporating puddle lights shining downward therefrom and an optional ultrasonic sensor on at least one end of the sensor bar.

More specifically, and with particular reference to FIGS. 3 and 4, basic details of the sensor bar 20 according to this example embodiment are described. The sensor bar 20 provides one form of optional housing 22 for containing and protecting ultrasonic sensors such as face sensors 26 and optionally also at least one end sensor 28 (and typically a pair of end sensors 28 on each end of the bar 20).

The sensor bar 20 in this embodiment is of elongate form with a square cross-section, so that it has an upper surface 21 of generally horizontal form. At least one bracket or other attachment mechanism can be provided on the upper surface 21 to allow it to be secured beneath a threshold T of the doorway where the doors D control access into and out of the bus B. For attachment of the center bar 20, a variety of different fasteners and/or brackets can be utilized. The fasteners can be mechanical fasteners, such as screws, bolts, rivets and customized brackets. Other alternatives include utilization of adhesives, hook and loop fastening systems, welding, and other attachment systems for either permanent or temporary attachment of the sensor bar 20 to the bus B. While the sensor bar 20 or other sensor housing is located beneath the threshold T in this embodiment, the sensors could be provided in other locations to monitor the sensor area 80 just outside of the doorway of the bus B.

The sensor bar 20 typically includes other facets such as a front face 23 which has the face sensors 26 extending horizontally outwardly therefrom. End faces 25 at each end of the elongate sensor bar 20 can be square in form and can optionally include end sensors 28 thereon. Such end sensors can sense foreign objects slightly forward of or behind the doorway, where an individual or foreign object might be located after entrapment by the door D.

A lower face 24 opposite the upper surface 21 faces downward. In one embodiment, puddle lights 30 focused to emit light and with a control (automatically or at selection by an operator) to cause the puddle lights to shine down and illuminate ground near an area where passengers often step when boarding and off-boarding the bus B through the doorway. Power to the sensor bar 20 (for the lights 30 and sensors 26, 28) can be provided along a wire 29 which can also carry a signal from the sensor bar 20 to the ultrasonic sensor pre-processor 50 or other equipment of the overall system to which the sensor bar 20 is attached. A rear face of the sensor bar typically is not utilized for any particular function, and can provide a surface against which interior elements within the sensor bar 20 can be surface mounted if desired and otherwise provide containment for equipment within the sensor bar 20.

Other optional equipment within the sensor bar 20 could include a power supply if it is needed, which could include batteries or other power supply equipment onboard the center bar 20, and optionally a heating system, such as to melt ice/snow and to prevent accumulation in a manner which could defeat operation of the sensor bar 20. The sensor bar 20 typically has a length similar to but slightly longer than a width of the doorway of the bus B. However, in alternative embodiments, the sensor bar 20 could be slightly shorter than or more than a small amount longer than the doorway and still function effectively. Further as an option, ultrasonic sensors could be provided without the sensor bar 20, and built directly into an outer surface of the bus B or other vehicle, adjacent to the doorway (or conceivably within lower portions of doors D of the doorway).

In one embodiment, outputting of an output signal from the sensors such as those associated with the sensor bar 20 occurs through connecting sensor bar 20 to a CAN (Control Area Network) of the bus B or other vehicle. If the bus B has some alternate network for managing electrical control of different sub-systems within the bus, the system 10 of this invention could be utilized by interfacing with such an alternate network. It could optionally be a stand alone system not integrated into vehicle networks or other existing systems.

Most typically, at least one processor is provided which is coupled to the CAN 40 or other network on the bus B or other vehicle. This processor in one embodiment includes an ultrasonic sensor pre-processor 50 and a system control module 60. Functions of such pre-processor 50 and control module 60 could be combined together in a single processor/module or could be broken into more than two separate modules. The wire 29 can be provided between any such multiple modules to effectuate the function of the processor.

In this example embodiment, the pre-processor 50 includes functions such as diagnostics, error checking, logic to determine if any of the sensors 26, 28 are functioning properly and if they have detected an alarm condition. False positives can be to some extent eliminated within the pre-processor 50 if programming calls for two or more separate sensors 26, 28 to be detecting a nearby object before an alarm condition is outputted. Details such as frequency with which ultrasonic sound waves are emitted from the sensors 26, 28 can be managed by a pre-processor. In one embodiment, the pre-processor 50 merely outputs to the system control module 60 either an alarm state or a non-alarm state. The control module 60 can supply power to the pre-processor 50 which can in turn provide power to the sensors 26, 28 and other equipment such as puddle lights 30, heaters, etc. within the sensor bar 20.

A system control module 60 can communicate an alarm condition through the CAN 40 or other network to provide a useful safety output. With particular reference to FIG. 5, various outputs 70 are disclosed. Engine control 71 could be controlled, such as to keep the engine E (FIG. 2) from operating when an alarm condition exists. A transmission control 72 such as a Brake Transmission System Interrupt (BTSI) can be utilized so that when an alarm condition exists the vehicle transmission cannot shift out of park. A brake control 73 such as a parking brake can be engaged when an alarm condition exists, or kept from disengaging, especially if the parking brake is an electronic parking brake associated with wheels W of the bus B. Other outputs can include warning lights 74, audible alarms 75 or other indicators which can be readily sensed by a driver of the bus B. In one embodiment, the driver is entrusted to take responsible action when an alarm condition is reported to the driver, such as with an audible alarm sound or visible alarm light. In other embodiments, either in addition to or separate from such driver alarms, the bus B can be prevented from operation or brought to a stop if it is moving, etc.

In one embodiment, the alarm signal can cause the doors D of the bus B to open through a door control 76. Any door sensors D on the doors could be replaced by the system 10 of this invention or door D sensors can be utilized along with the system 10 of this invention and integrated together for enhanced safety.

If desired, controls can be provided to the bus B driver, such as volume controls to adjust loudness of any alarm signals. A reset button can be provided within access of the driver which can allow an alarm condition to be turned off by pushing such a reset button. As an option, this resetting of the alarm condition can be disabled unless the doors D of the bus B are first opened and closed. As a further option, any such reset button can be placed adjacent to the doors D, requiring the bus driver to move to the location of the doors D to push the reset button, which also gives the driver a clear opportunity to fully inspect the sensor area 80 just outside of the doors D to ensure no foreign object is present. A foreign object would generally be defined as anything that should not be located directly outside of the doorway of the bus B. The alarm condition and alarm signals such as visible lights or sound would typically automatically cease when the ultrasonic sensors no longer sense the presence of any foreign object, so that the reset button would only be needed when a foreign object continues to be sensed within the sensor area 80.

This disclosure is provided to reveal a preferred embodiment of the invention and a best mode for practicing the invention. Having thus described the invention in this way, it should be apparent that various different modifications can be made to the preferred embodiment without departing from the scope and spirit of this disclosure. When embodiments are referred to as "exemplary" or "preferred" this term is meant to indicate one example of the invention, and does not exclude other possible embodiments. When structures are identified as a means to perform a function, the identification is intended to include all structures which can perform the function specified.

What is claimed is:

1. A method for protecting bus passengers while boarding and off-boarding the bus at a doorway thereof, the method including the steps of:

opening a door of the bus to open access through the doorway for passengers to board and/or off-board the bus through the doorway;

closing the door of the bus to at least partially block access through the doorway for passengers;

sensing when a foreign object is present outside of the doorway;

said sensing step generating a safety output;

wherein said sensing step includes the safety output using a brake transmission shift interlock (BTSI) to keep a transmission of the bus out of a drive state;

wherein said sensing step includes at least one ultrasonic sensor oriented facing an exterior space outside of the doorway of the bus;

wherein said sensing step includes only sensing reflected ultrasonic sound waves which are sufficiently recent that they indicate closeness to the doorway of the bus within a set range; and wherein said sensing step includes a horizontally extending bar mounted beneath a threshold of the doorway of the bus, with a plurality of ultrasonic sensors oriented at least partially horizontally away from the bus.

2. The method of claim 1 wherein said sensing step includes the safety output including an audible alarm within hearing of a driver of the bus.

3. The method of claim 1 wherein said sensing step includes the safety output including a visible warning light within vision of a driver of the bus.

4. The method of claim 1 wherein said set range of said sensing step is about one foot away from the doorway.

* * * * *